United States Patent
Jin et al.

(10) Patent No.: US 8,633,900 B2
(45) Date of Patent: Jan. 21, 2014

(54) SCREEN DISPLAY METHOD FOR MOBILE TERMINAL

(75) Inventors: Sang Hoon Jin, Suwon-si (KR); Su Yeul Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 812 days.

(21) Appl. No.: 12/070,877

(22) Filed: Feb. 21, 2008

(65) Prior Publication Data

US 2008/0204424 A1 Aug. 28, 2008

(30) Foreign Application Priority Data

Feb. 22, 2007 (KR) .................. 10-2007-0017692

(51) Int. Cl.
*G06F 3/048* (2013.01)
*G06F 3/041* (2006.01)

(52) U.S. Cl.
USPC ..................... 345/173; 715/790; 715/784

(58) Field of Classification Search
USPC ......................... 345/156–173, 700
See application file for complete search history.

(56) References Cited

U.S. PATENT DOCUMENTS

| | | | | |
|---|---|---|---|---|
| 4,862,389 A * | 8/1989 | Takagi | ............ | 715/794 |
| 5,438,661 A * | 8/1995 | Ogawa | ............ | 715/804 |
| 6,215,490 B1 * | 4/2001 | Kaply | ............ | 715/788 |
| 7,676,761 B2 * | 3/2010 | Oliver et al. | .......... | 715/803 |
| 2004/0070629 A1 * | 4/2004 | Seifert | ............ | 345/810 |
| 2004/0100479 A1 * | 5/2004 | Nakano et al. | .......... | 345/700 |
| 2006/0187204 A1 * | 8/2006 | Yi et al. | ............ | 345/158 |

FOREIGN PATENT DOCUMENTS

| | | |
|---|---|---|
| JP | 2003-209609 | 7/2003 |
| JP | 2006-236355 | 9/2006 |
| KR | 1020030088374 | 11/2003 |

* cited by examiner

*Primary Examiner* — Amare Mengistu
*Assistant Examiner* — Jennifer Zubajlo

(57) ABSTRACT

A content display method for a mobile terminal is disclosed. The mobile terminal includes at least two hierarchical structures each having at least two contents at a level. The content display method includes: displaying, in response to selection of a content, a window associated with the selected content; displaying, in response to input of a multi-window display request, windows associated with contents at the same level as the selected content together on a single screen; and rearranging, in response to input of a window movement request, the content windows by window movement to display the rearranged content windows together on a single screen. As a result, same-level contents or application windows in execution can be displayed together on a single screen according to a user request. Hence, the user can readily transition between contents or applications with enhanced user convenience.

30 Claims, 21 Drawing Sheets

SCREEN DISPLAY METHOD FOR MOBILE TERMINAL

CROSS-REFERENCE TO RELATED APPLICATION(S) AND CLAIM OF PRIORITY

The present application claims priority to an application entitled SCREEN DISPLAY METHOD FOR MOBILE TERMINAL" filed in the Korean Intellectual Property Office on Feb. 22, 2007 and assigned Serial No. 2007-0017692, the contents of which are incorporated herein by reference.

TECHNICAL FIELD OF THE INVENTION

The present invention relates generally to a mobile terminal and, more particularly, to a screen display method for a mobile terminal wherein a plurality of contents belonging to the same level or a plurality of applications in execution can be displayed together on a single screen in response to user inputs.

BACKGROUND OF THE INVENTION

A mobile phone, MP3 player, personal digital assistant, portable multimedia player, digital camera and notebook are examples of mobile terminals. Such a mobile terminal has a display unit including, for example, liquid crystal display devices to display various contents to the user. The user viewing the screen can select and execute a desired function through manipulation of a touch pad or key buttons.

Normally, contents are categorized and organized in a hierarchical structure to facilitate selection and management. Contents at a particular level can be accessed through upper level categories.

However, in a hierarchical structure of contents, during playback of a content, the user may have to navigate the levels one by one through the hierarchical structure to select another content.

The mobile terminal also provides various applications (programs) such as a phonebook, note pad, calculator, scheduler, and remote control. The user may desire to simultaneously execute multiple applications and activate them one after the other.

However, only a window associated with a selected and activated application is displayed on the screen, and windows associated with other applications are hidden from the screen. To transition from the activated application to another application, the user may have to close or reduce the window associated with the activated application and then find a target application. In particular, if the target application is the last one, the user is inconvenienced by having to close or reduce those windows associated with applications arranged between the activated application and the target application.

SUMMARY OF THE INVENTION

To address the above-discussed deficiencies of the prior art, it is a primary object to provide a screen display method for a mobile terminal that enables easy transitions between contents.

The present invention also provides a screen display method for a mobile terminal wherein a plurality of contents belonging to the same level can be simultaneously displayed on the screen.

The present invention further provides a screen display method for a mobile terminal that enables easy transitions between applications in execution.

The present invention further provides a screen display method for a mobile terminal wherein a plurality of applications in execution can be simultaneously displayed on the screen.

In accordance with an exemplary embodiment of the present invention, there is provided a content display method for a mobile terminal using at least two hierarchical structures each having at least two contents at a level, including: displaying, in response to selection of a content, a window associated with the selected content; displaying, in response to input of a multi-window display request, windows associated with contents at the same level as the selected content together on a single screen; and rearranging, in response to input of a window movement request, the content windows by window movement to display the rearranged content windows together on a single screen.

In accordance with another exemplary embodiment of the present invention, there is provided a content display method for a mobile terminal having a motion sensor and touch screen, using at least two hierarchical structures each having at least two contents at a level, including: detecting, during display of a window associated with a selected content, a user action through the motion sensor; displaying, if a user action is detected, windows associated with contents at the same level as the selected content together in a form of a stack on a single screen; and rearranging the content windows by window movement through a touch to the touch screen to display the rearranged content windows together on a single screen.

In accordance with another exemplary embodiment of the present invention, there is provided an application display method for a mobile terminal, including: displaying, in response to selection of an application during execution of multiple applications, a window associated with the selected application; displaying, in response to input of a multi-window display request, windows associated with the applications in execution together on a single screen; and rearranging, in response to input of a window movement request, the application windows by window movement to display the rearranged application windows together on a single screen.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile terminal.

In the description, the term "content" refers to multimedia data such as a song, photograph, moving image, game, document, or data file. Contents may include items or category information for classification. Contents are displayed as windows on a display unit of the mobile terminal. The term "descriptive listing" refers to information on contents. Content information includes a character, image, number, symbol, or combination thereof, and may denote the name, image, or category of an associated content. For example, the descriptive listing of a music content can include an artist name, song title, and album jacket image. The term "application" refers to a program that is written to implement one of specific functions of the mobile terminal, such as a phonebook, note pad, calculator, scheduler, and remote control.

For the purpose of description, a mobile communication terminal is described as an example of a mobile terminal of the present invention. However the present invention is not limited to a mobile communication terminal. The mobile terminal of the present invention is a terminal for user convenience, and may be any information and communication appliance or multimedia appliance, such as a mobile communication terminal, mobile phone, wired/wireless phone, personal digital assistant (PDA), smart phone, audio player, MP3 player, notebook, or personal computer.

Figure 1:
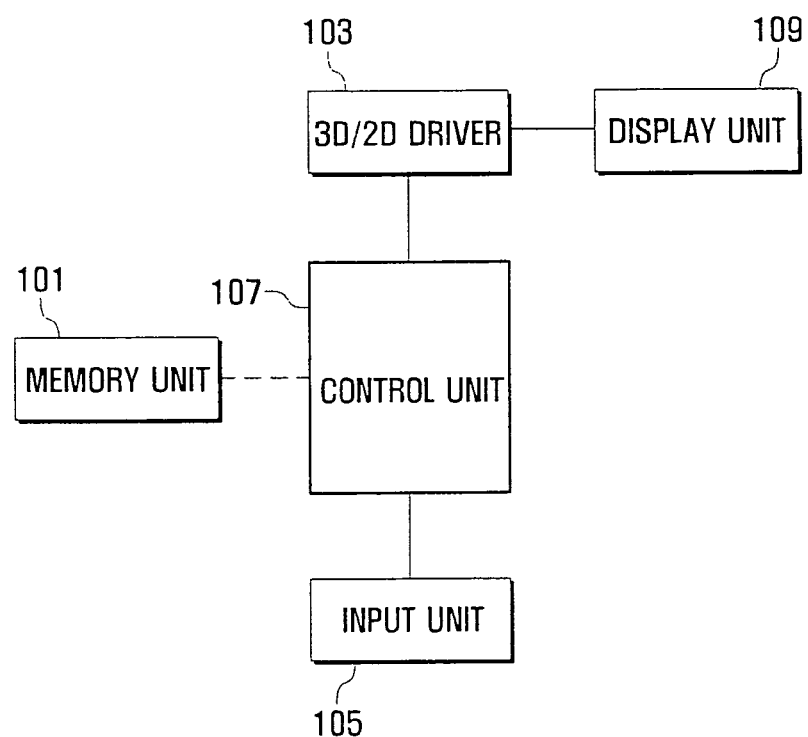
FIG. 1 is a schematic block diagram illustrating a mobile terminal to display contents and applications in accordance with the principles of the present invention.

FIG. 1 is a schematic block diagram illustrating a mobile terminal to display contents and applications in accordance with the principles of the present invention.

Referring to FIG. 1, the mobile terminal includes a memory unit 101, 3D/2D driver 103, input unit 105, control unit 107, and display unit 109.

The memory unit 101 may include a program storage section and a data storage section. In particular, the memory unit 101 includes at least two hierarchical structures having a plurality of contents. In response to a multi-window display request by the user during display of a content, the memory unit 101 arranges contents that are at the same level as the displayed content in the form of an opaque stack, transparent stack, tile board, or folding fan, and temporarily stores the arranged contents.

In addition, the memory unit 101 may be an internally or externally installable unit. The memory unit 101 may also be a server (for example, a content server) delivering data to the mobile terminal through a wired or wireless connection. In this case, the mobile terminal further includes a transceiver section for communication with the server.

The 3D/2D driver 103 enables the display unit 109 to display contents as three or two-dimensional images to the user. In humans, left and right eyes are horizontally separated by about 65 mm, thereby causing binocular disparity, which is known as the most important factor of three-dimensional effects. That is, the left and right eyes send different two-dimensional images of an object through the retina to the brain. The brain then fuses the two-dimensional images together into a three-dimensional image of the original object, and produces depth and reality information. Using this principle, the 3D/2D driver 103 enables display of contents as three or two-dimensional images.

The input unit 105 inputs a signal for manipulation of the mobile terminal from the user. In particular, the input unit 105 inputs user signals related to content search and selection, display of contents at the same level, movement of one or more windows, and scrolling. If the display unit 109 (described later) has touch-screen capabilities, it can act as an input unit.

The input unit 105 can include any of a key pad having a plurality of key buttons, touch panel for converting a touch event into an input signal, pointing device such as an optical mouse, jog dial in the form of a rotation dial, touch wheel for converting a touch and rotation into an input signal, scroll wheel for converting a rotation action into an input signal, and the like.

The control unit 107 controls the overall operation of the mobile terminal. In particular, the control unit 107 controls display of contents. During content display, in response to a multi-window display request, the control unit 107 controls the display unit 109 to display those contents at the same level as the currently displayed content in the form of an opaque stack, transparent stack, tile board, or folding fan. When multiple windows are displayed, the control unit 107 controls the display unit 109 to reduce window sizes. The control unit 107 controls the display unit 109 to display abridged content information in windows other than the front window. That is, some information such as the numbers of descriptive listings may be omitted from display.

In response to a request for single window movement or multiple window movement during display of windows associated with same-level contents, the control unit 107 controls the display unit 109 to rearrange the windows accordingly. In response to a scrolling request during display of same-level content windows, the control unit 107 controls the display unit 109 to scroll the front one or all of the windows depending upon settings by the user.

The control unit 107 can recognize a multi-window display request from the input unit 105 in various manners according to the configuration of the mobile terminal. For example, if a motion sensor is equipped, the control unit 107 recognizes shaking of the mobile terminal by the user as a multi-window display request. If the display unit 109 has a touch-screen capability, the control unit 107 recognizes dragging on the lower end of the display unit 109 as a multi-window display request. If a touch wheel or scroll wheel is equipped, the control unit 107 recognizes pressing of the wheel center as a multi-window display request. The control unit 107 may also recognize a multi-window display request by other means. In response to a multi-window display request, the control unit 107 can display inactive content windows without some descriptive listings in order to effectively display multiple content windows within the limited display space of the display unit 109.

The control unit 107 can recognize a single window movement request from the input unit 105 in various manners according to the configuration of the mobile terminal. For example, the control unit 107 recognizes turning of the mobile terminal perpendicularly to the ground, touching of the front window on the display unit 109, or a small amount of wheel rotation, as a single window movement request. The control unit 107 may also recognize a single window movement request by other means.

The control unit 107 can recognize a multiple window movement request from the input unit 105 in various manners according to the configuration of the mobile terminal. For example, the control unit 107 recognizes turning of the mobile terminal parallel with the ground, dragging from the front window to the last window on the display unit 109, or a large amount of wheel rotation, as a multiple window movement request. The control unit 107 may also recognize a multiple window movement request by other means.

The control unit 107 can recognize a scrolling request from the input unit 105. For example, the control unit 107 recognizes touching of a scroll bar on the display unit 109 as a scrolling request, which causes scrolling of the front one or all of the content windows. The control unit 107 may also recognize a scrolling request by other means.

The display unit 109 displays data from the control unit 107. The display unit 109 may include a panel of liquid crystal display (LCD) devices, LCD controller, and memory device for storing image data to be displayed. If the panel has a touch screen capability, the display unit 109 can also act as an input means.

In response to selection of a content, the display unit 109 displays the selected content and associated descriptive listing. The content may be a song, photograph, moving image, game, document, or data file. The descriptive listing is information on the content, and may denote the name, image, or category of the associated content.

In response to a multi-window display request during content display, the display unit 109 displays requested contents in an arrangement described before. In response to a single or multiple window movement request, the display unit 109 moves content windows to display the rearranged content windows. In response to a scrolling request, the display unit 109 scrolls one or more content windows according to preset settings.

The display unit 109 can display abridged content information in content windows other than the front window. When multiple content windows are displayed, the display unit 109 displays a full descriptive listing in the front (active) content window, and displays partial descriptive listings in the remaining inactive content windows. That is, the display unit 109 can display only representative information such as images or categories for contents in inactive content windows.

Figure 2:
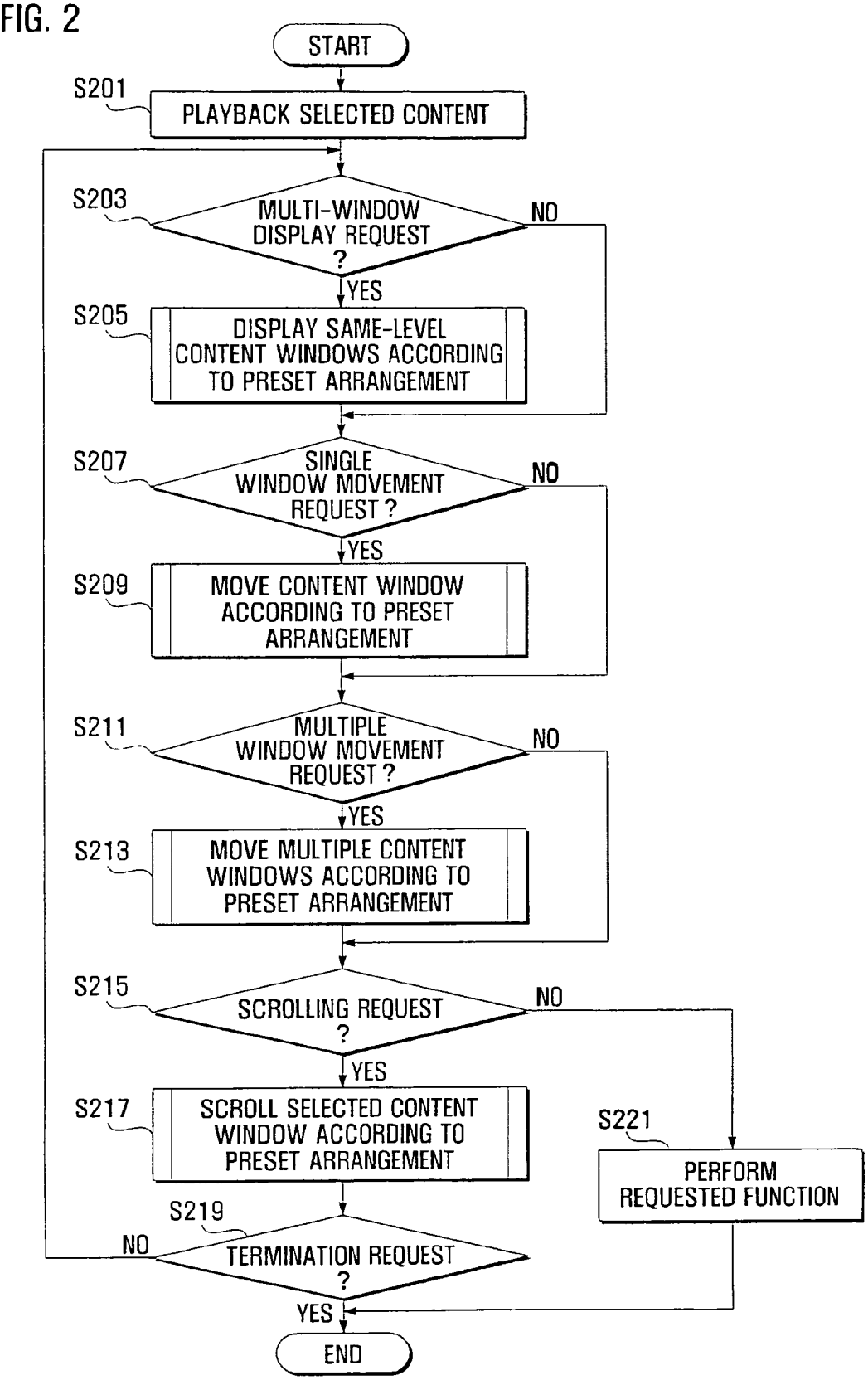
FIG. 2 is a flow chart illustrating a content display method according to an exemplary embodiment of the present invention.
Figure 3:
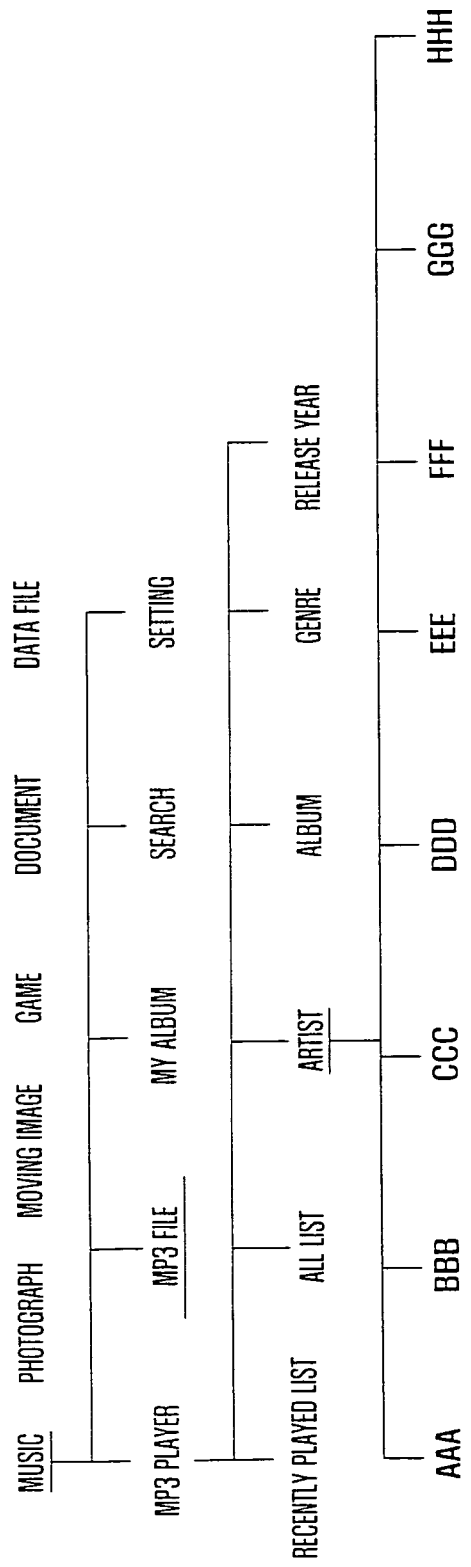
FIG. 3 is a diagram illustrating a hierarchical structure of contents.
Figure 4:
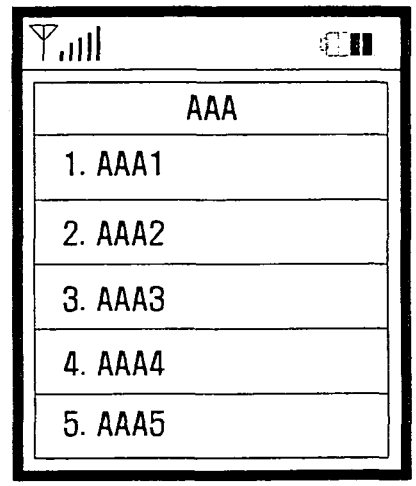
FIG. 4 is a screen representation of a content window.

Hereinafter, a content display method of the present invention is described. FIG. 2 is a flow chart illustrating a content display method according to an exemplary embodiment of the present invention. FIG. 3 is a diagram illustrating a hierarchical structure of contents. FIG. 4 is a screen representation of a content window.

Referring to FIG. 2, upon selection of a content, the control unit 107 of the mobile terminal plays back the selected content (S201). Music contents are used to describe the present method. Music contents are managed using a hierarchical structure illustrated in FIG. 3, where top-level items are 'music', 'photograph', 'moving image', 'game', 'document', and 'data file'. The 'music' item has lower-level items 'Mp3 player', 'Mp3 file', 'my album', 'search' and 'setting'. The 'Mp3 file' item has lower-level items 'recently-played list', 'all list', 'artist', 'album', 'genre' and 'release year'. The 'artist' item has lower-level items AAA, BBB, CCC, DDD, EEE, FFF, GGG and HHH. That is, the structure of FIG. 3 has three levels, and each level has five to eight lower-level items. FIG. 4 corresponds to a state where the artist 'AAA' is selected and songs released by the artist 'AAA' are listed. That is, the control unit 107 recognizes selection of the artist 'AAA', and displays a descriptive listing of the selected artist 'AAA' on the display unit 109.

The control unit 107 checks whether a multi-window display request is input from the user during display of the selected content window (S203).

Figure 5A:
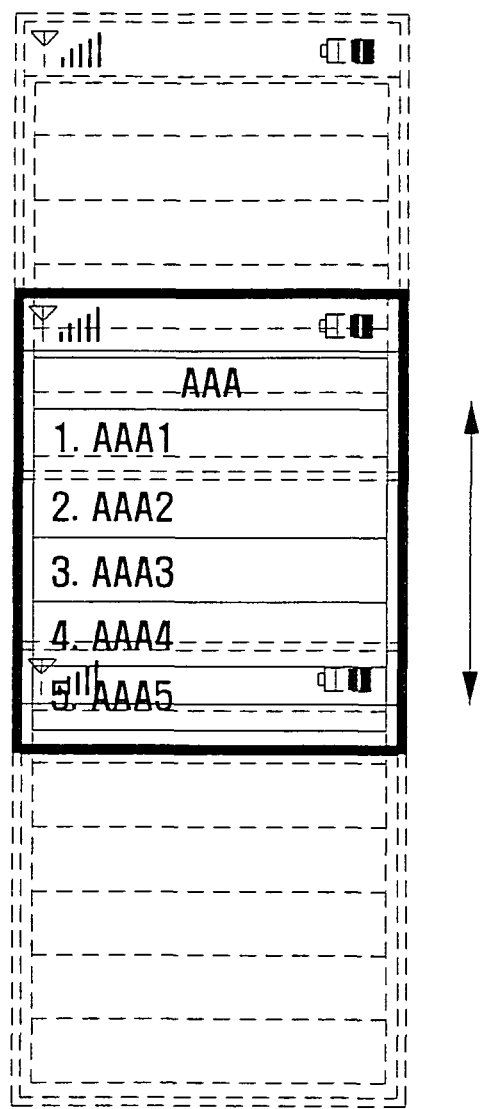
FIGS. 5A to 5C illustrate window manipulation by a user for content window display.
Figure 5B:
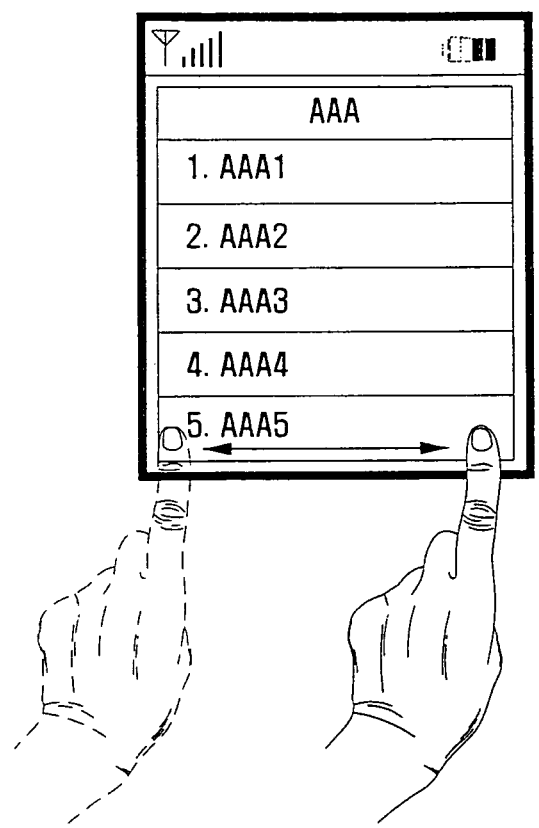
Figure 5C:
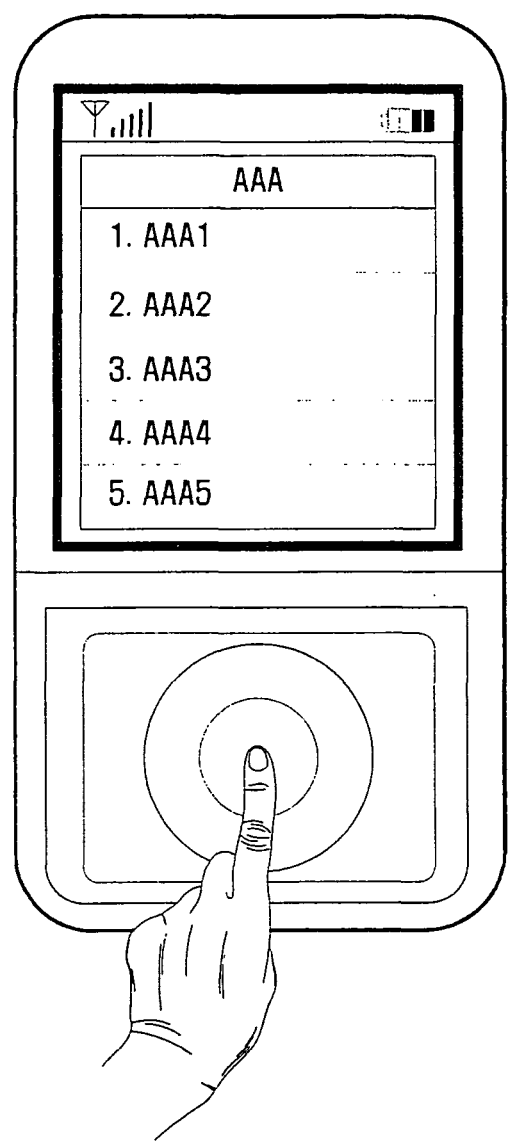

FIGS. 5A to 5C illustrate window manipulation by a user for content window display.

As illustrated in FIG. 5A, if a motion sensor is equipped, the control unit 107 can recognize shaking of the mobile terminal by the user as a multi-window display request. As illustrated in FIG. 5B, if the display unit 109 has a touch-screen capability, the control unit 107 can recognize dragging on the lower end of the display unit 109 as a multi-window display request. As illustrated in FIG. 5C, if a touch wheel or scroll wheel is equipped, the control unit 107 can recognize pressing of the wheel center as a multi-window display request.

If a multi-window display request is input from the user, the control unit 107 displays contents windows associated with those contents at the same level as the currently selected content according to user settings (S205).

FIGS. 6A to 6D are screen representations illustrating various forms of content window display. FIGS. 7A to 7E are additional screen representations illustrating various forms of content window display.

Referring to FIGS. 6A to 6D, same-level content windows AAA, BBB, CCC and DDD (corresponding to artists) are displayed, and their lower-level items AAA1, AAA2, AAA3, AAA4, AAA5 and the like (corresponding to songs) are also displayed.

Figure 6A:
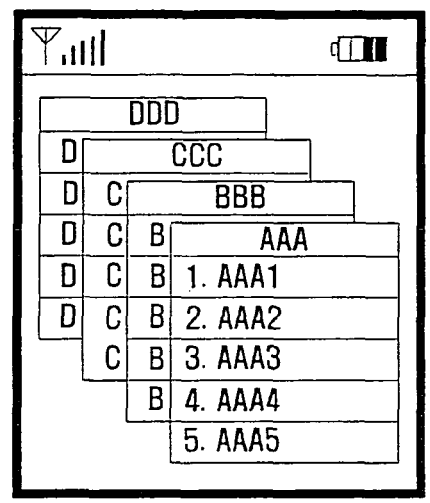
FIGS. 6A to 6D are screen representations illustrating various forms of content window display.
Figure 6B:
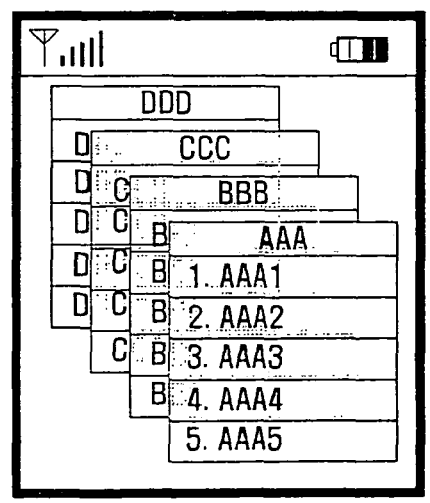
Figure 6C:
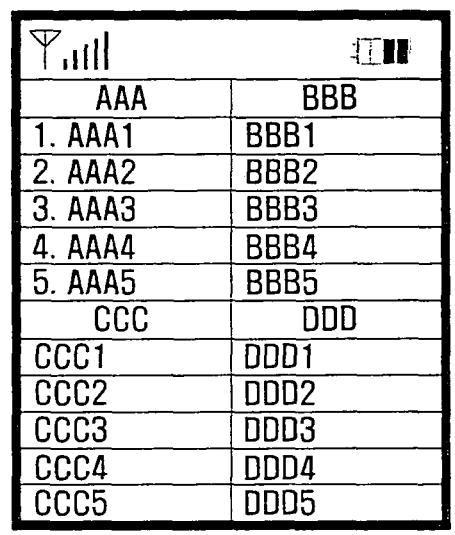
Figure 6D:
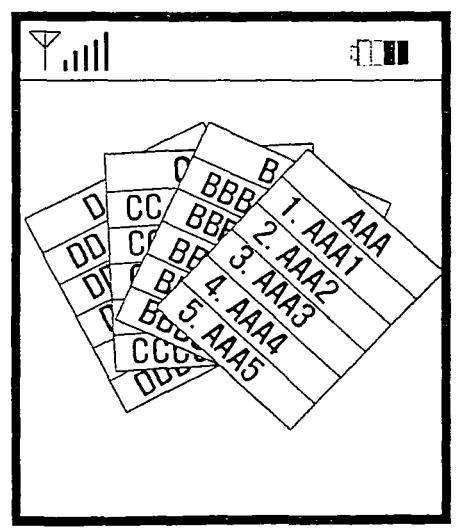

In response to input of the multi-window display request, the control unit 107 can display the same-level content windows in the form of an opaque stack (FIG. 6A), in the form of a transparent stack (FIG. 6B), in the form of a tile board (FIG. 6C), or in the form of a folding fan (FIG. 6D). In FIGS. 6A and 6B, the windows overlap each other. However, content windows may be displayed in other forms. For example, odd numbered windows are stacked together and the remaining windows are not stacked. In FIG. 6C, content windows do not overlap each other, and the user can readily distinguish the windows. In display of same-level content windows, abridged content information is displayed in the windows other than the front window.

Referring to FIGS. 7A to 7E, same-level content windows AAA, BBB, CCC and DDD (corresponding to artists) are displayed, and their descriptive listings such as categories, album images and songs are also displayed.

Figure 7A:
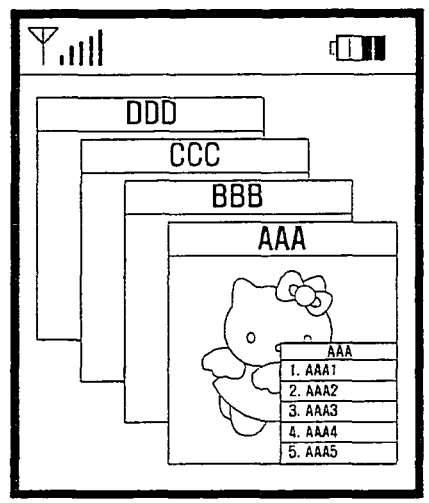
FIGS. 7A to 7E are additional screen representations illustrating various forms of content window display.
Figure 7B:
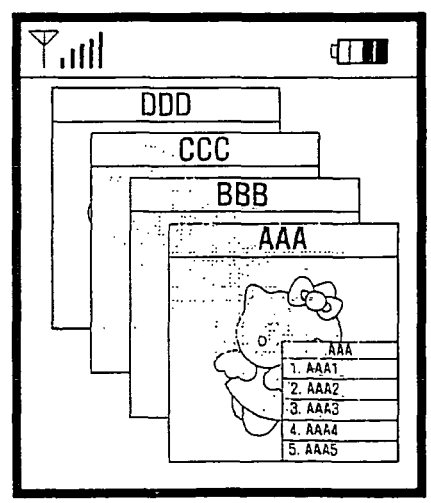
Figure 7C:
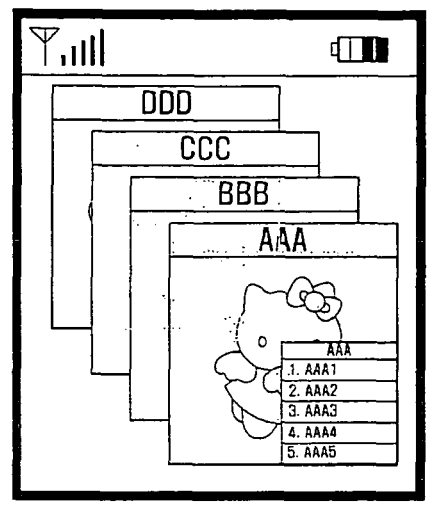
Figure 7D:
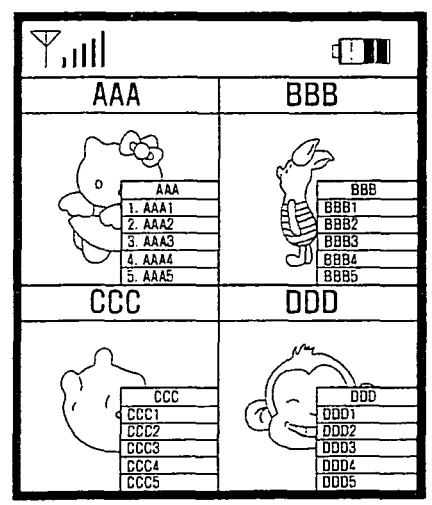
Figure 7E:
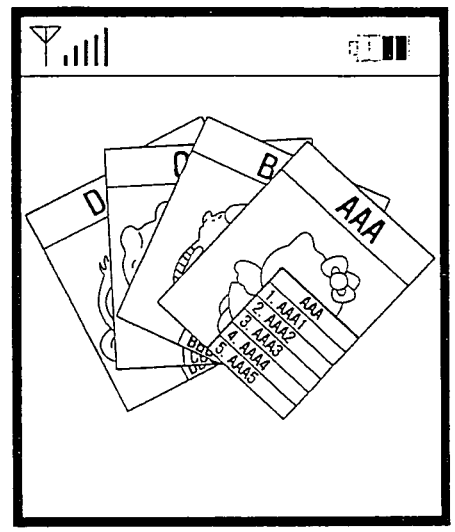

In response to input of the multi-window display request, the control unit 107 can display the same-level content windows in the form of an opaque stack (FIG. 7A), in the form of a transparent stack (FIG. 7B or FIG. 7C), in the form of a tile board (FIG. 7D), or in the form of a folding fan (FIG. 7E). In FIG. 7B, each content window includes an associated descriptive listing. In FIG. 7C, only the active content window (front window) includes an associated descriptive listing.

The control unit 107 checks whether a single window movement request is input from the user during display of multiple content windows (S207).

FIGS. 8A to 8E illustrate manipulation of content windows for single window movement.

Figure 8A:
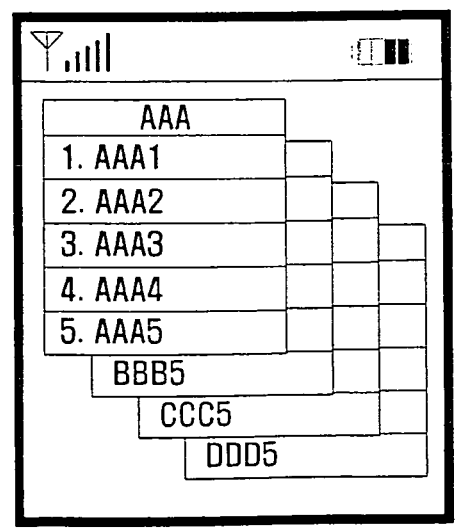
FIGS. 8A to 8E illustrate manipulation of content windows for single window movement.

During display of multiple content windows in the form of, for example, an opaque stack as in FIG. 8A, the control unit 107 detects input of a single window movement request.

Figure 8B:
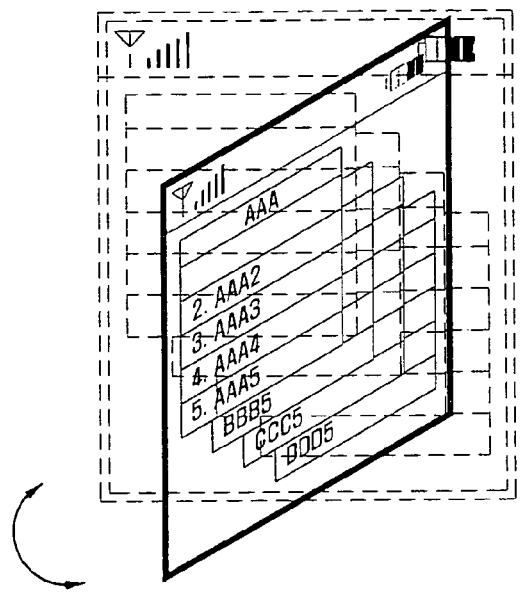
Figure 8C:
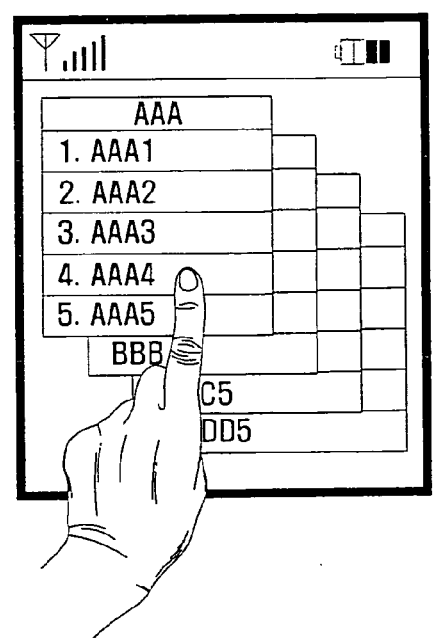
Figure 8D:
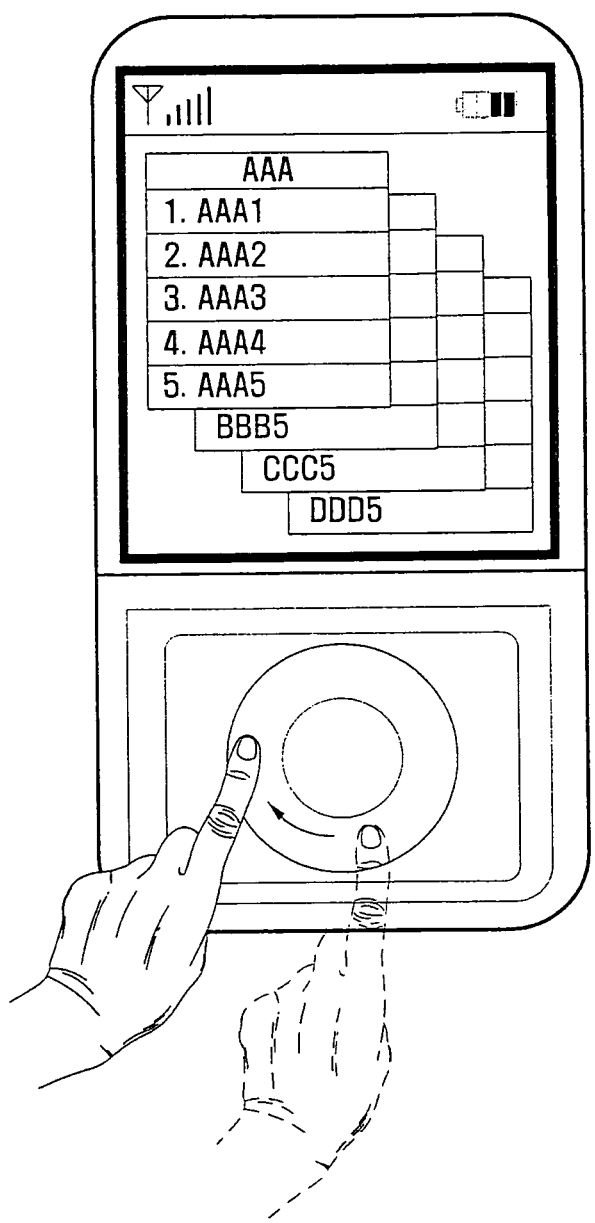

As illustrated in FIG. 8B, if a motion sensor is equipped, the control unit 107 can recognize turning of the mobile terminal perpendicularly to the ground as a single window movement request. As illustrated in FIG. 8C, if the display unit 109 has a touch-screen capability, the control unit 107 can recognize touching of a window to be moved (for example, the front window) on the display unit 109 as a single window movement request. As illustrated in FIG. 8D, if a touch wheel or scroll wheel is equipped, the control unit 107 can recognize a small amount of wheel rotation as a single window movement request.

Figure 8E:
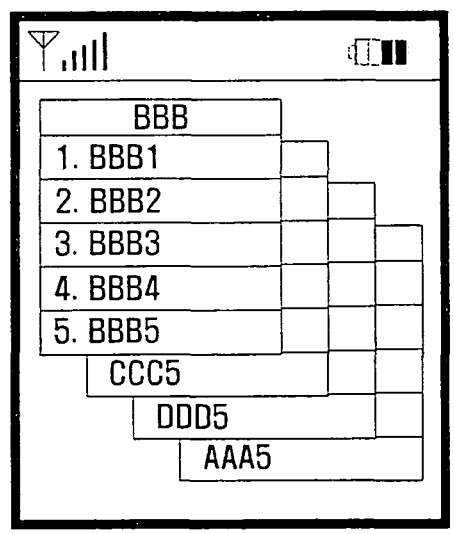

In response to input of a single window movement request, the control unit 107 performs a window movement operation (S209). The control unit 107 rearranges the content windows so that the front content window becomes the last window and the second content window becomes a new front window, as illustrated in FIG. 8E. Arrangement of content windows after performance of a window movement operation may differ depending upon the window arrangement prior to performance of the window movement operation.

The control unit 107 checks whether a multiple window movement request is input from the user during display of multiple content windows (S211).

FIGS. 9A to 9E illustrate manipulation of content windows for multiple window movement.

Figure 9A:
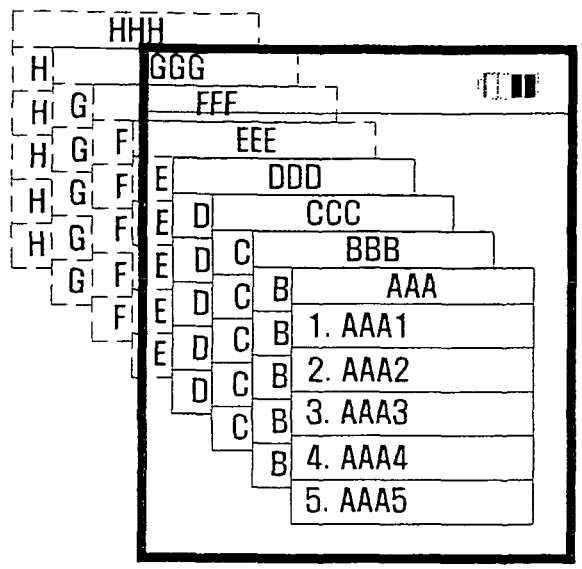
FIGS. 9A to 9E illustrate manipulation of content windows for multiple window movement.
Figure 9B:
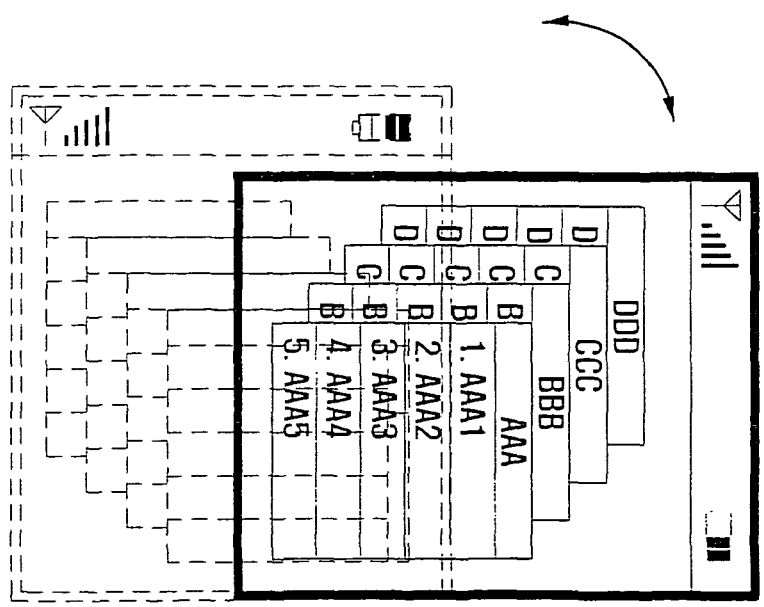
Figure 9C:
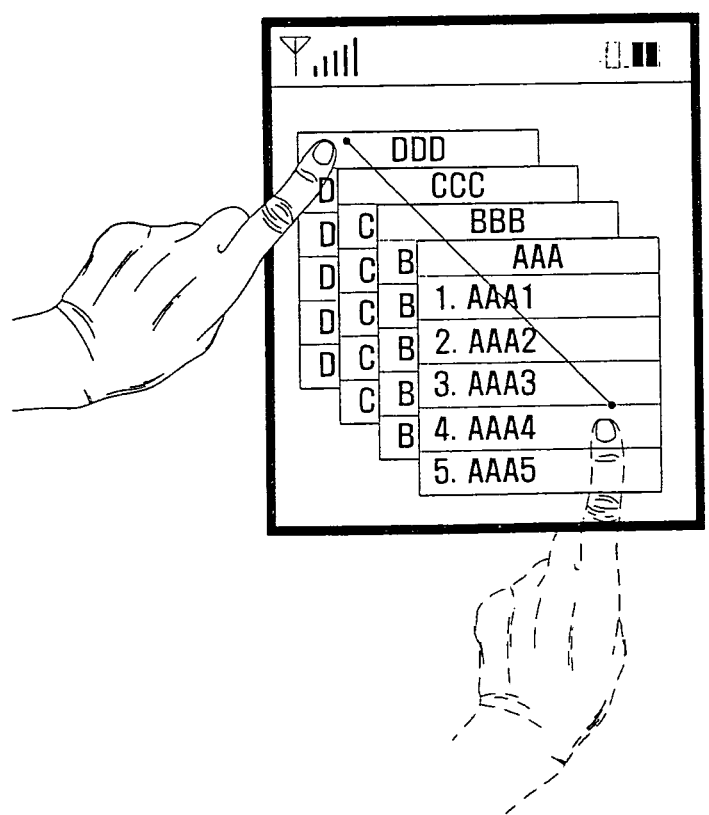
Figure 9D:
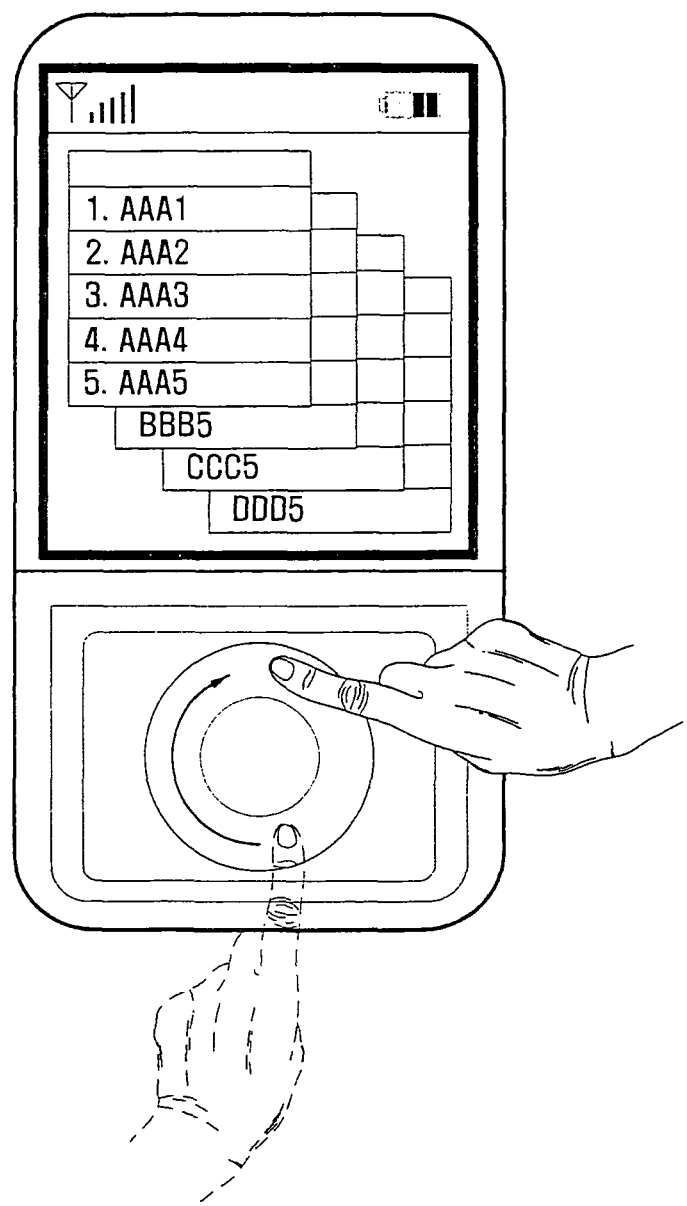

During display of multiple content windows as in FIG. 9A, the control unit 107 detects input of a multiple window movement request. As illustrated in FIG. 9B, if a motion sensor is equipped, the control unit 107 can recognize turning of the mobile terminal parallel with the ground as a multiple window movement request. As illustrated in FIG. 9C, if the display unit 109 has a touch-screen capability, the control unit 107 can recognize dragging from the front window to the last window on the display unit 109 as a multiple window movement request. As illustrated in FIG. 9D, if a touch wheel or scroll wheel is equipped, the control unit 107 can recognize a large amount of wheel rotation as a multiple window movement request.

Figure 9E:
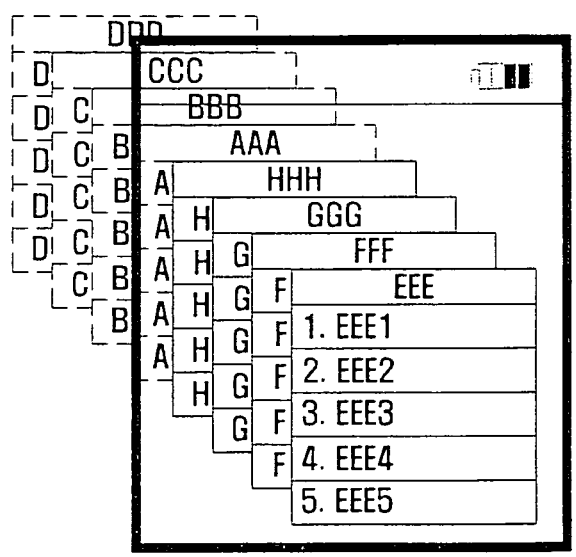

In response to input of a multiple window movement request, the control unit 107 performs a multiple window movement operation (S213). The control unit 107 rearranges content windows so that the content windows in display become invisible and content windows not in display become visible on the display unit 109, as illustrated in FIG. 9E.

The control unit 107 checks whether a scrolling request is input from the user during display of multiple content windows (S215).

Figure 10A:
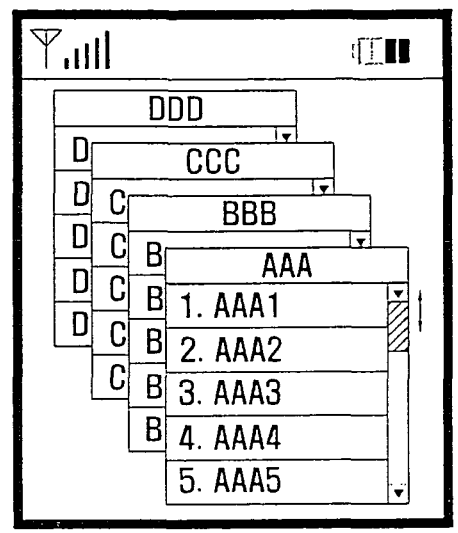
FIGS. 10A and 10B illustrate manipulation of content windows for scrolling.
Figure 10B:
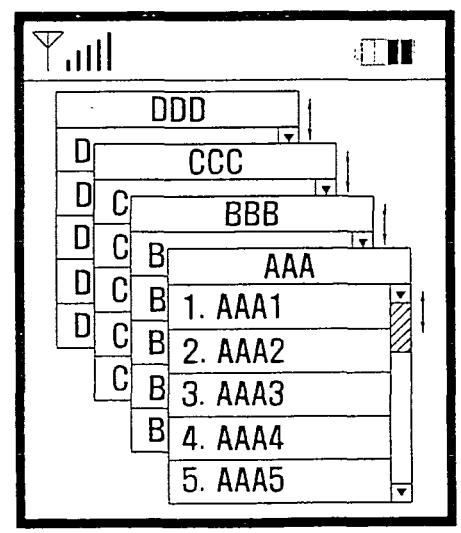

FIGS. 10A and 10B illustrate manipulation of content windows for scrolling.

During display of multiple content windows, the control unit 107 detects input of a scrolling request. If the display unit 109 has a touch-screen capability, the control unit 107 can recognize touching or dragging of the scroll bar as a scrolling request.

If a scrolling request is input, the control unit 107 performs a scrolling operation according to preset settings (S217). The control unit 107 can scroll the front content window as illustrated in FIG. 10A, or scroll all content windows in display as illustrated in FIG. 10B. Scrolling operations can be performed in other manners.

If a request other than a window manipulation request is input, the control unit 107 performs a requested function (S221).

The control unit 107 checks whether a termination request is input (S219). If a termination request is input, the control unit 107 finishes the process. Otherwise, the control unit 107 returns to step S203 for further processing.

Detection and processing of requests for multi-window display, single window movement, multiple window movement, and scrolling may also be performed in other manners.

In the present embodiment, the description is focused on music contents. The present method can also be applied to other types of contents. For example, photographs can be arranged using a hierarchical structure. In response to a multi-window display request during display of a photograph taken at a particular date, a list of same-level photographs taken at different dates can be displayed as content windows. The front (active) window can include thumbnail images representing photographs and titles of the photographs. The remaining windows can be arranged in the form of a stack so as to include partial or whole descriptive listings associated with photographs.

In the content display method of the present embodiment using a hierarchical structure of contents, same-level contents are displayed together on a single screen according to a user request. Hence, the user can readily transition between contents (select a different content), enhancing user convenience.

Next, another exemplary embodiment of the present invention is described. Descriptions of elements and steps identical to or corresponding to those in FIG. 2 are omitted.

An application display method of the present embodiment is similar to the content display method of FIG. 2, but differs in that in response to a multi-window display request during execution of multiple applications, windows associated with the multiple applications in execution are displayed together on a single screen.

Referring to FIG. 1, the memory unit 101 stores various applications. In response to a multi-window display request by the user when multiple applications are in execution and an application is selected for display, the memory unit 101 arranges the applications in execution in the form of an opaque stack, transparent stack, tile board, or folding fan, and temporarily stores the arranged applications.

When multiple applications are in execution and an application is selected for display, the control unit 107 rearranges application windows in response to requests for multi-window display, single window movement, multiple window movement, and scrolling.

The display unit 109 displays multiple selected applications, and an active application window. When multiple applications are in execution and an application is selected for display, the display unit 109 displays application windows rearranged according to preset settings in response to requests for multi-window display, single window movement, multiple window movement, and scrolling.

Figure 11:
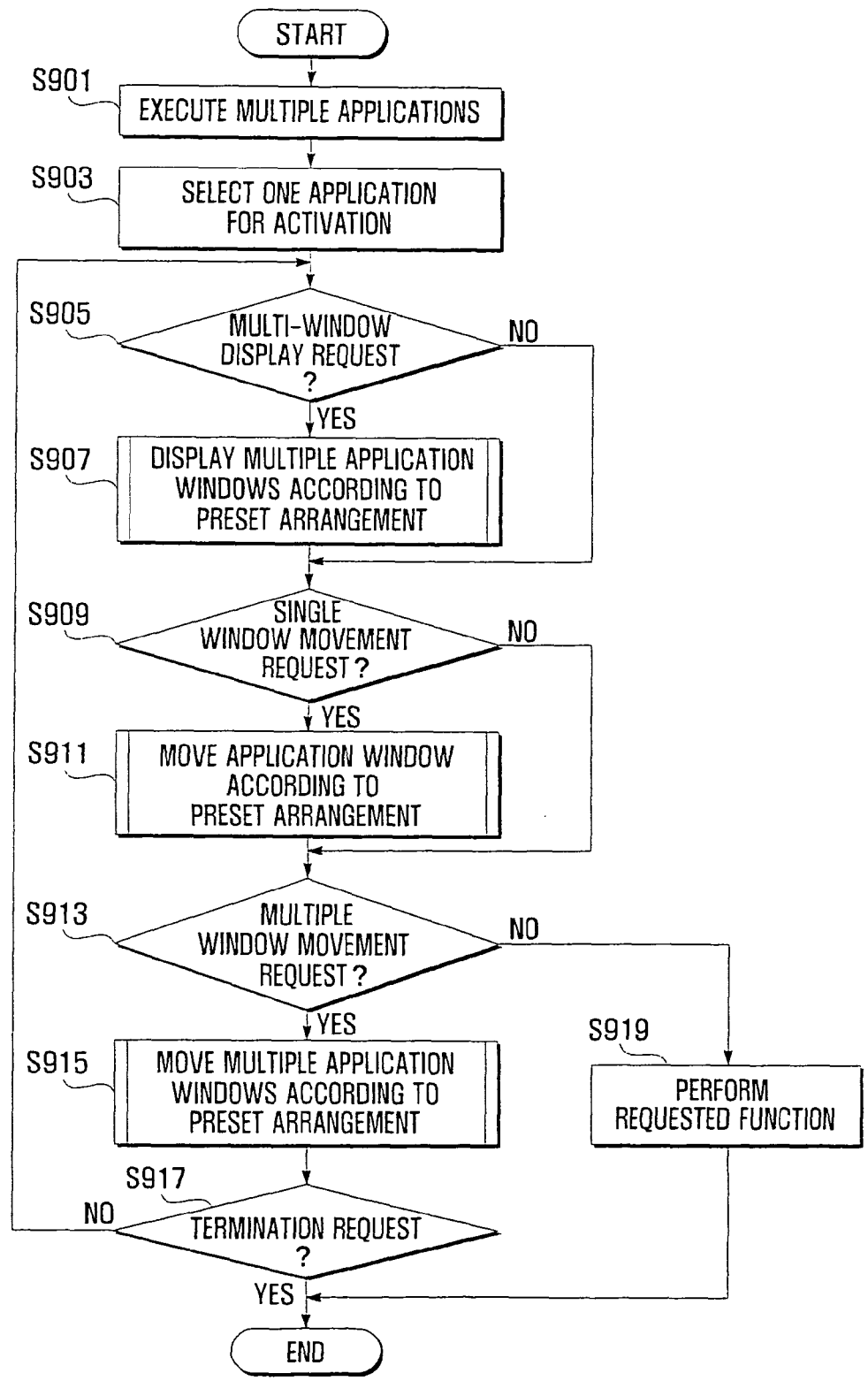
FIG. 11 is a flow chart illustrating an application display method according to another exemplary embodiment of the present invention.

FIG. 11 is a flow chart illustrating an application display method according to another exemplary embodiment of the present invention. The application display method includes steps similar to those of the content display method in FIG. 2.

Referring to FIG. 11, the control unit 107 executes multiple applications selected by the user (S901). The user can direct the control unit 107 to execute multiple stored applications if necessary.

The control unit 107 activates, upon selection of one of the applications in execution by the user, the selected application (S903). The window associated with the activated application is displayed on the display unit 109.

When multiple applications are in execution and an application is selected for display, the control unit 107 checks whether a multi-window display request is input by the user (S905). Recognition of a multi-window display request is described in connection with FIG. 2.

If a multi-window display request is input, the control unit 107 displays multiple application windows according to preset settings (S907). Arrangement of multiple windows is described in connection with FIG. 2.

During display of the multiple application windows, the control unit 107 checks whether a single window movement request is input from the user (S909). Recognition of a single window movement request is described in connection with FIG. 2.

If a single window movement request is input, the control unit 107 moves the application windows according to preset settings (S911). Processing of single window movement is described in connection with FIG. 2.

During display of the multiple application windows, the control unit 107 checks whether a multiple window movement request is input from the user (S913). Recognition of a multiple window movement request is described in connection with FIG. 2.

If a multiple window movement request is input, the control unit 107 moves multiple application windows according to preset settings (S915). Processing of multiple window movement is described in connection with FIG. 2.

If a request other than a window manipulation request is input, the control unit 107 performs a requested function (S919).

The control unit 107 checks whether a termination request is input (S917). If a termination request is input, the control unit 107 finishes the process. Otherwise, the control unit 107 returns to step S905 for further processing.

The application display method may further include a step for scrolling.

As apparent from the above description, the present invention provides a screen display method for a mobile terminal wherein same-level contents or application windows in execution can be displayed together on a single screen according to a user request. Hence, the user can readily transition between contents or applications with enhanced user convenience.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A content display method for a mobile terminal using at least one hierarchical structure comprising a plurality of contents included in a first level, the method comprising:
    displaying, in response to a selection of one of the plurality of contents included in the first level, a window associated with the selected content, the displayed window comprising a set of sub-contents associated with the selected content at a second level that is below the first level;
    displaying, in response to a multi-window display request while the window associated with the selected content is displayed, a plurality of windows associated with the plurality of contents included in the same level as the selected content concurrently on a single screen, at least one of the plurality of displayed windows other than the window associated with the selected content concurrently displaying the set of sub-contents at the second level; and
    rearranging, in response to a window movement request, the plurality of windows according to the window movement request to display the rearranged plurality of windows concurrently on the single screen.

2. The content display method of claim 1, wherein displaying the window associated with the selected content comprises displaying on the window a descriptive listing of the associated sub-contents including at least one of a character, an image, a number, a symbol, and a category for each associated sub-content.

3. The content display method of claim 2, wherein displaying the plurality of windows associated with the plurality of contents included in the same level as the selected content comprises displaying the plurality of windows in a form of a stack.

4. The content display method of claim 3, wherein displaying the plurality of windows associated with the plurality of contents included in the same level as the selected content comprises displaying partial descriptive listings on inactive ones of the displayed windows.

5. The content display method of claim 1, wherein displaying the plurality of windows associated with the plurality of contents included in the same level as the selected content comprises detecting an input of the multi-window display request by recognizing at least one of a user action using a motion sensor, a touch using a touch sensor, an amount of wheel turning using a scroll wheel, and a key press of a particular key.

6. The content display method of claim 1, wherein rearranging the plurality of windows according to the window movement request comprises changing an order of the plurality of windows in units of a single window.

7. The content display method of claim 6, wherein changing the order of the plurality of windows comprises detecting input of the window movement request by recognizing at least one of a user action using a motion sensor, a touch using a touch sensor, an amount of wheel turning using a scroll wheel, and a key press of a particular key.

8. The content display method of claim 1, further comprising rearranging, in response to a multiple window movement request, the plurality of windows in units of multiple windows to display the rearranged plurality of windows concurrently on a single screen.

9. The content display method of claim 8, wherein rearranging the plurality of windows in units of multiple windows comprises detecting input of the multiple window movement request by recognizing at least one of a user action using a motion sensor, a touch using a touch sensor, an amount of wheel turning using a scroll wheel, and a key press of a particular key.

10. The content display method of claim 1, further comprising scrolling, in response to a scrolling request, the plurality of displayed windows.

11. The content display method of claim 10, wherein scrolling the plurality of displayed windows comprises detecting input of a scrolling request by recognizing at least one of a user action using a motion sensor, a touch using a touch sensor, an amount of wheel turning using a scroll wheel, and a key press of a particular key.

12. A content display method for a mobile terminal having a motion sensor and touch screen and using at least one hierarchical structure comprising a plurality of contents included in a first level, the method comprising:

detecting, during a display of a window associated with a selected content, a user action through the motion sensor, the displayed window comprising a set of sub-contents associated with the selected content at a second level that is below the first level;

displaying, if the user action is detected, a plurality of windows associated with the plurality of contents included in the same level as the selected content a plurality of windows associated with the plurality of contents included in the same level as the selected content concurrently in a form of a stack on a single screen, at least one of the plurality of displayed windows other than the window associated with the selected content concurrently displaying the set of sub-contents at the second level; and rearranging the plurality of windows by window movement according to a touch gesture on the touch screen to display the rearranged plurality of windows concurrently on the single screen.

13. The content display method of claim 12, wherein displaying the window associated with the selected content comprises displaying a descriptive listing of the associated sub-contents on the window.

14. The content display method of claim 13, wherein displaying the plurality of windows associated with the plurality of contents included in the same level as the selected content comprises displaying partial descriptive listings on inactive ones of the displayed windows.

15. The content display method of claim 14, wherein detecting a user action comprises detecting an amount of wheel turning using a scroll wheel.

16. The content display method of claim 14, wherein rearranging the plurality of windows by window movement comprises shifting windows in display forward so that the front window becomes the last window and the second window becomes a new front window.

17. The content display method of claim 14, wherein rearranging the plurality of windows by window movement comprises shifting windows in display backward so that the last window becomes a new front window and the old front window becomes the second window.

18. The content display method of claim 14, wherein rearranging the plurality of content windows by window movement comprises moving windows so that a group of windows in display becomes not displayed and a group of windows not in display becomes displayed.

19. An application display method for a mobile terminal, the method comprising:

activating, in response to a selection of one of a plurality of applications that are in execution, an application window associated with the selected application, activating the application window comprising displaying the activated application window including a portion of an interface for the selected application on a display unit;

displaying, in response to a multi-window display request while the activated application is displayed, a plurality of application windows associated with the plurality of applications that are in execution concurrently on the display unit, at least one of the plurality of displayed application windows other than the application window associated with the selected application concurrently displaying a set of sub-contents at the second level; and rearranging, in response to a window movement request, the plurality of application windows according to the window movement request to display the rearranged plurality of application windows concurrently on the display unit.

20. The application display method of claim 19, wherein displaying the plurality of application windows concurrently comprises displaying the application windows in a form of a stack.

21. The application display method of claim 20, wherein displaying the plurality of application windows concurrently comprises displaying partial descriptive listings corresponding to the plurality of application windows except the activated application window.

22. The application display method of claim 19, wherein displaying the plurality of application windows concurrently comprises detecting input of the multi-window display request by recognizing at least one of a user action using a motion sensor, a touch using a touch sensor, an amount of wheel turning using a scroll wheel, and a key press of a particular key.

23. The application display method of claim 19, wherein rearranging the plurality of application windows comprises shifting windows in display forward so that the front window becomes the last window and the second window becomes a new front window.

24. The application display method of claim 19, wherein rearranging the plurality of application windows comprises shifting windows in display backward so that the last window becomes a new front window and the old front window becomes the second window.

25. The application display method of claim 19, wherein rearranging the plurality of application windows further comprises detecting a multiple window movement request for moving application windows in units of multiple windows.

26. An information appliance including a display unit and a user input unit and using at least one hierarchical structure comprising a plurality of contents included in a first level, wherein the information appliance is configured to:

display, in response to a selection of one of the plurality of contents included in the first level, a window associated with the selected content, the displayed window comprising a set of sub-contents associated with the selected content at a second level that is below the first level;

display, in response to a multi-window display request while the window associated with the selected content is displayed, a plurality of windows associated with the plurality of contents included in the same level as the selected content concurrently on a single screen of the display unit, at least one of the plurality of displayed windows other than the window associated with the selected content concurrently displaying the set of sub-contents at the second level; and rearrange, in response to a window movement request, the plurality of windows according to the window movement request to display the rearranged plurality of windows concurrently on the single screen.

27. The information appliance of claim 26, wherein the information appliance is further configured to display the window associated with the selected content by displaying on the window a descriptive listing of the associated sub-contents including at least one of a character, image, number, symbol, category for each associated sub-content.

28. The information appliance of claim 27, wherein the information appliance is further configured to display the plurality of windows associated with the plurality contents included the same level as the selected content by displaying the plurality of windows in a form of a stack.

29. The information appliance claim 28, wherein the information appliance is further configured to display the plurality of windows associated with the plurality contents included in the same level as the selected content by displaying partial descriptive listings on inactive ones of the displayed windows.

30. The information appliance of claim 26, wherein the information appliance is further configured to display the plurality of windows associated with the plurality contents included in the same level as the selected content by detecting an input of the multi-window display request by recognizing at least one of a user action using a motion sensor, a touch using a touch sensor, an amount of wheel turning using a scroll wheel, and a key press of a particular key.

* * * * *